3,039,707
APPARATUS FOR WINDING WIRE INTO A HELIX
Alfred C. Beck, Red Bank, and Edwin L. Chinnock, Rumson, N.J., assignors to Bell Telephone Laboratories, Incorporated, New York, N.Y., a corporation of New York
Filed Nov. 27, 1959, Ser. No. 855,905
2 Claims. (Cl. 242—9)

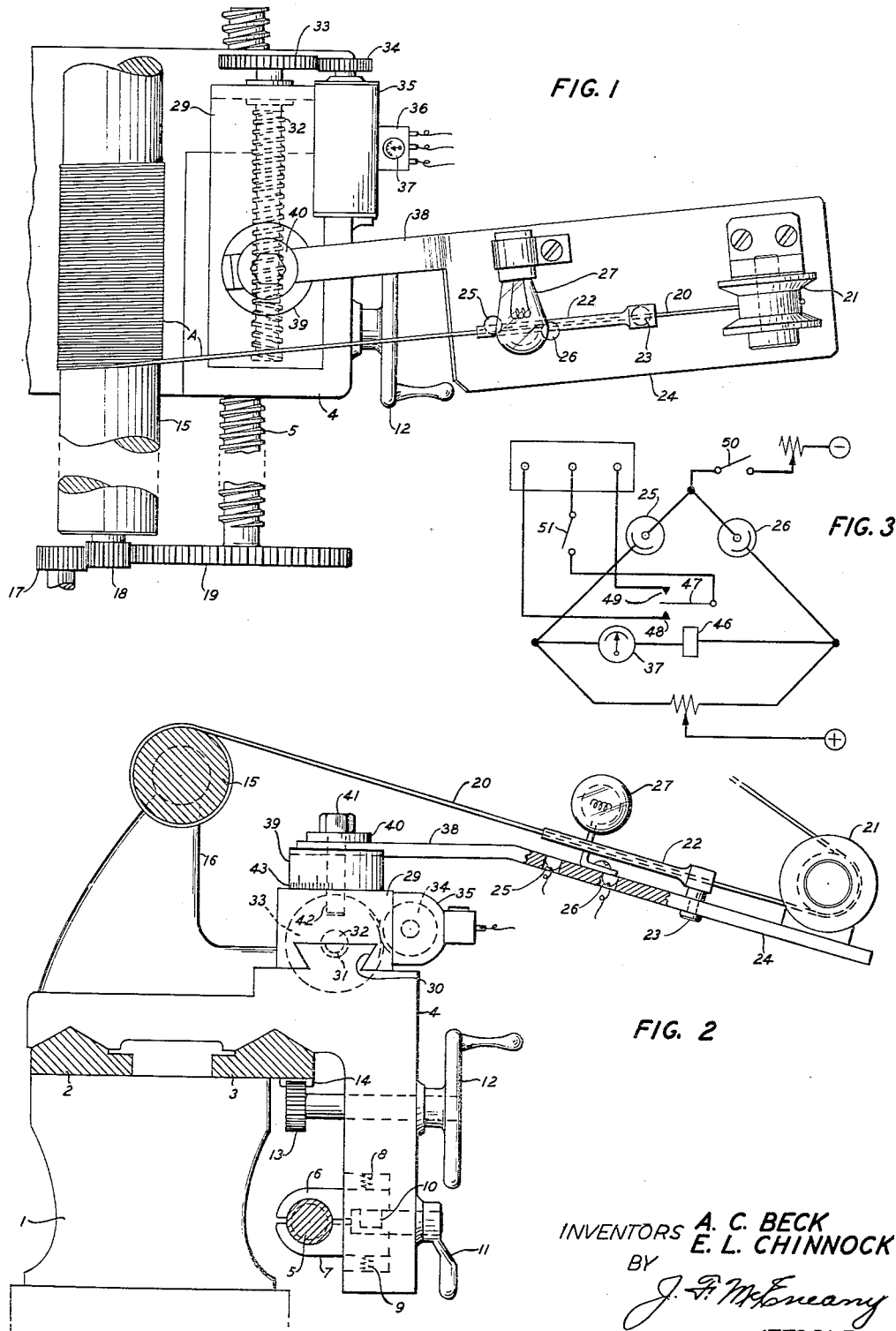

This invention relates to apparatus for winding wire into a helix and particularly to improvements therein permitting the fabrication of a uniformly close-wound solenoid helix.

The object of this invention is to control a helix winding mechanism in such a manner as to economically fabricate an accurately dimensioned, relatively long solenoid helix suitable for use in a guided wave transmission system.

In the fabrication of a circular wave mode transmission medium, such as the helix waveguide disclosed particularly in FIG. 5 of United States Patent 2,848,695, August 19, 1958, to J. R. Pierce, it is necessary that the wire be wound in a manner such that there will be a uniform insulating separation between adjacent turns throughout the entire length of the helix. This insulating separation is formed by the insulating coating of the wire and should, between all turns, be less than the diameter of the wire. It is, therefore, highly important that each turn closely contact the preceding adjacent turn and that the closeness of this contact be the same for all adjacent turns.

A successful mechanism for winding a helix waveguide is a lathe of sufficient size to accommodate for rotation a relatively long mandrel together with associated means for guiding a wire to the mandrel and for advancing the wire guiding means in the direction of the axis of the mandrel one wire diameter for each mandrel revolution.

A close-wound helix waveguide may be fabricated successfully on a lathe if the wire is fed to the rotating mandrel at an angle to the mandrel axis. With an angle slightly less than ninety degrees, the wire being fed to the rotating mandrel will roll over the previous turn at the point of contact to insure close contact between all turns of the helix as the wire feed advances parallel to the axis of the mandrel. The angle selected to produce the desired result will depend on wire size, type of insulation and winding speed. However, it is necessary to the production of a satisfactory helix waveguide that the angle between the path of wire approach and the axis of the mandrel be maintained constant throughout a winding operation which, in the winding of a helix waveguide fifteen feet long with wire approximately five mils in diameter, will require 30,000 turns of wire, each turn of which must be uniformly closely wound to its preceding adjacent turn throughout the entire length of the waveguide. If this angle becomes smaller than the angle initially selected, the wire will wind back on the coil already wound on the mandrel and, if this angle becomes greater than the selected angle, each succeeding turn will be less closely wound and, in fact, may be physically separated from its preceding adjacent turn.

While an accurately machined lead screw in a lathe should give a carriage feed closely approximating one wire diameter advance per mandrel revolution for the diameter of wire being employed, it has been found that variations in lathe tolerances and variations in wire diameter cause undesired changes in the wire approach angle from that initially selected. It has been found necessary, therefore, to introduce correction in the advance rate of the wire guiding means during a winding operation to maintain constant the desired preselected angle between the wire approach path and the mandrel axis.

In accordance with this invention, as described in the following specification and shown in the accompanying drawings, applicants provide novel means for producing instantaneous automatic correction of the wire guide advance rate, the said means being operable in response to the slightest change in the preselected angle between the path of wire approach and the axis of the mandrel.

In the drawings:
FIG. 1 is a plan view of a wire winding mechanism with associated wire feed control means in accordance with this invention;
FIG. 2 is a side elevation of the mechanism shown in FIG. 1; and
FIG. 3 illustrates the electrical circuit included in the control means in accordance with this invention.

Referring to FIGS. 1 and 2, numeral 1 indicates a lathe bed which supports parallel tracks 2 and 3. A carriage 4 is supported on tracks 2 and 3 for movement therealong. The carriage 4 may be moved along the tracks by means of a power driven lead screw 5. As shown, particularly in FIG. 2, a means is provided for selectively engaging or disengaging the carriage 4 from the lead screw 5. This means takes the form of a pair of threaded members 6 and 7 pivotally mounted in the carriage 4 and urged to nonengaging position by springs 8 and 9. A cam surfaced member 10 rotatable by a handle 11 forces the pivoted members 6 and 7 into engagement with lead screw 5 against the action of springs 8 and 9.

If the carriage 4 is disengaged from lead screw 5 it may be manually moved along the tracks 2 and 3 by means of wheel 12 which rotates gear 13 in engagement with a toothed rack 14 on the underside of track 3.

A centerless ground, polished steel mandrel 15 is mounted at both ends on bearings supported in pedestals 16 (one of which is shown) located at opposite ends of the lathe.

As shown schematically in FIG. 1, a motor driven gear 17 engages a gear 18 which in turn engages gear 19 attached to the end of lead screw 5. Rotation of gear 17, therefore, produces rotation of mandrel 18 and lead screw 5. The lead screw 5 should produce forward movement of carriage 4 parallel to the axis of mandrel 15 a distance equal to the diameter of a wire 20 for each complete revolution of the mandrel.

The path of wire 20 prior to its engagement with a freely rotatable guide roller 21 is not shown in the drawings. In its path to guide roller 21, however, the wire 20 is taken off its spool in a standard over-end de-reeler equipped with snubbers and guide loops so that the reel weight does not affect tension. After passing through a bath of acetone for cleaning and degreasing, the wire passes through a standard wire tensioning device and then to roller 21.

After passing around roller 21 the wire 20 passes through an opaque tube 22 which is supported at one end on a vertical pivot 23 mounted in a supporting base 24. The pivot for opaque tube 22 provides a fixed guide point for the wire 20 in its travel to the mandrel 15 on which it is wound.

The support 24 is provided with a pair of apertures in each of which is mounted a photoconductive cell, as shown at 25 and 26. Member 24 also supports a lamp 27 which is energized from a suitable source (not shown) to provide a light beam directed toward the cells 25 and 26.

In FIG. 1, the opaque light obscuring member 22 is shown in its normal position permitting an equal amount of light to reach each of the cells 25 and 26. These are the adjusted relative positions of these elements for the selected angle of approach of wire 20 to mandrel 15 at the start of a winding operation.

Referring particularly to FIG. 2, a compound rest 29 is mounted for movement on a track portion 30 of the carriage 4. This track portion 30 is provided with a threaded semicircular recess 31. The compound rest 29 has a threaded shaft 32 mounted on bearings therein and engages the threaded recess portion 31 in track portion 30 of carriage 4. Thus, rotation of shaft 32 will produce movement of compound rest 29 relative to carriage 4 and this movement may be forward or backward parallel to the axis of lead screw 5 depending upon the direction of rotation of the shaft 32.

A gear 33, mounted in shaft 32, meshes with a gear 34 mounted on the shaft of a reversible motor 35. This motor is mounted on and movable with the compound rest 29. An enclosure 36, mounted on the motor casing, contains the control circuit elements for motor 35. This control circuit includes a meter 37 shown mounted on the upper surface of enclosure 36. The zero indication for this meter is at the center of the scale and scale readings are to the right or left depending upon the direction of flow of current through the meter.

The supporting means 24 is provided with an integral narrow extension 38 which fits into a groove in the upper surface of a circular member 39. The member 39 together with supporting member 24 may be clamped in any desired horizontal angular position by means of a clamping washer 40 and a bolt 41, the threaded end of which extends into and engages an internal thread in a hole 42 in the compound rest 29. A scale indicated at 43 (FIG. 2), in cooperation of a fixed mark on the rest 29, provides a guide for adjustment of the angular position of the support 24 to obtain the desired angle (indicated at A, FIG. 1) of the path of approach of wire 20 to the mandrel 15.

Referring now to FIG. 3, the photoconductive cells 25 and 26 are shown connected in a balanced bridge circuit. If equal amounts of light reach each cell, no current will flow through relay 46 and meter 37. A switch element 47 is operative to either one of two positions to close the energizing circuit of motor 35 to produce rotation of this motor in either direction. Current flow through element 46 in one direction will cause switch element 47 to engage a contact 48 while current flow through element 46 in the opposite direction will cause switch element 47 to engage a contact 49. So long as the light obscuring element 22 is in its normal position to permit an equal amount of light to reach each of the cells 25 and 26, the switch element 47 will remain in its center position and the motor 35 will not be energized. A switch 50 is provided to connect the control circuit to a source of electrical energy. Also, a switch 51 is provided to connect the motor 35 with its source of electrical energy.

Prior to the commencement of winding operation, an operator first secures the end of wire 20 to the mandrel and places a few turns of the wire on the mandrel to insure attachment of the wire thereto. It is highly important at this point that these first few turns of wire be started at the correct pitch and that this pitch should not vary in any one of the turns around the mandrel circumferences. He then loosens bolt 41 and rotates supporting member 24 and member 39 until the preselected angle between the approach path of wire 20 and the axis of mandrel 15 is obtained, as indicated by the scale 43. These units are then clamped to compound rest 29 by tightening bolt 41. Upon completion of this operation, the light obscuring member 22 will not, in most cases, be in its normal position to permit an equal amount of light to reach photoconductive cells 25 and 26 because of the position of the carriage 4 at the time of angular adjustment of support 24.

The operator will then disconnect carriage 4 from lead screw 5 by operation of member 11 and will close switch 50 to energize the control circuit. If the obscuring member 22 is in other than normal position with respect to cells 25 and 26, the meter 37 will so indicate. The direction in which the needle of meter 37 moves from its center position will indicate the direction in which the support 24 must be moved parallel to the axis of mandrel 15 to bring the cells 25 and 26 into normal position under member 22.

The operator may then rapidly move the support 24 backward or forward by operation of wheel 12 to manually move the carriage 4, compound rest 29 and support 24 until a zero reading on meter 37 is obtained. Switch 51 is closed and the machine is started by re-engaging carriage 4 with lead screw 5 and energizing the driving motor which produces rotation of gear 17. From this point on, upon the slightest change in the approach path of wire 20, there will be an automatic introduction of a correction in the advance rate of the wire guide means to produce a return of the wire approach path to its initially adjusted angle with respect to the axis of the mandrel. For example, if, because of an increase in the diameter of wire 20, the angle A becomes smaller, the motor 35 will be operated in the proper direction to move the compound rest 29 and the support 24 forward relative to carriage 4 to advance the wire guide support 24 the amount necessary to return the wire path to its preselected position. Similarly, if the carriage 4 advance is such as to increase the angle A, the motor 35 will operate in the proper direction to move the compound rest 29 and support 24 backward relatively to carriage 4 until the path of wire 20 is at the initially selected angle with respect to the axis of mandrel 15.

What is claimed is:

1. The combination in a machine for winding a wire into a helix, of a mandrel, means for rotating said mandrel, a carriage, means for moving said carriage parallel to the axis of said mandrel during a winding operation, a compound rest mounted on said carriage to be movable within limits relative to said carriage in a direction parallel to the axis of said mandrel, means for guiding said wire to said mandrel, a support for said wire guiding means adjustably mounted on said compound rest in a manner to permit adjustment of the approach path of said wire at a predetermined angle to the axis of said mandrel, and means operable in response to a change in said predetermined angle of wire approach path during operation to produce movement of said compound rest relative to said carriage in a direction required to maintain constant the said predetermined angle throughout a winding operation.

2. The combination as defined in claim 1 in which the recited means operable to maintain constant the predetermined angle of wire approach comprises a reversible motor for effecting backward and forward movement of said compound rest, a normally open energizing circuit for said motor, means for closing said energizing circuit to said motor to either of two positions to produce rotation thereof in either direction of rotation, a pair of spaced photoconductive elements included in an electrical circuit, a beam of light directed toward said elements, a light obscuring means positioned to normally permit passage of equal amounts of said light beam to said photoconductive elements, said light obscuring means being movable across said beam of light in response to a change in the approach path of said wire to said mandrel to vary the amount of light received by each of said photoconductive elements, and electrical means in the circuit including said photoconductive elements for operating said motor circuit closure means to produce rotation of said motor in the proper direction and for a period of time necessary to return said light obscuring means to its normal position with respect to said light sensitive elements.

References Cited in the file of this patent

UNITED STATES PATENTS

| | | |
|---|---|---|
| 601,834 | Huestis | Apr. 5, 1898 |
| 2,327,790 | Hopkins | Aug. 24, 1943 |
| 2,426,631 | Mapes | Sept. 2, 1947 |
| 2,626,765 | Biddison | Jan. 27, 1953 |
| 2,845,229 | Bliss | July 29, 1958 |

FOREIGN PATENTS

| | | |
|---|---|---|
| 232,945 | Germany | Mar. 28, 1911 |